W. B. BURTON.
RIFLE SIGHT.
APPLICATION FILED FEB. 21, 1913.
1,142,665.
Patented June 8, 1915.
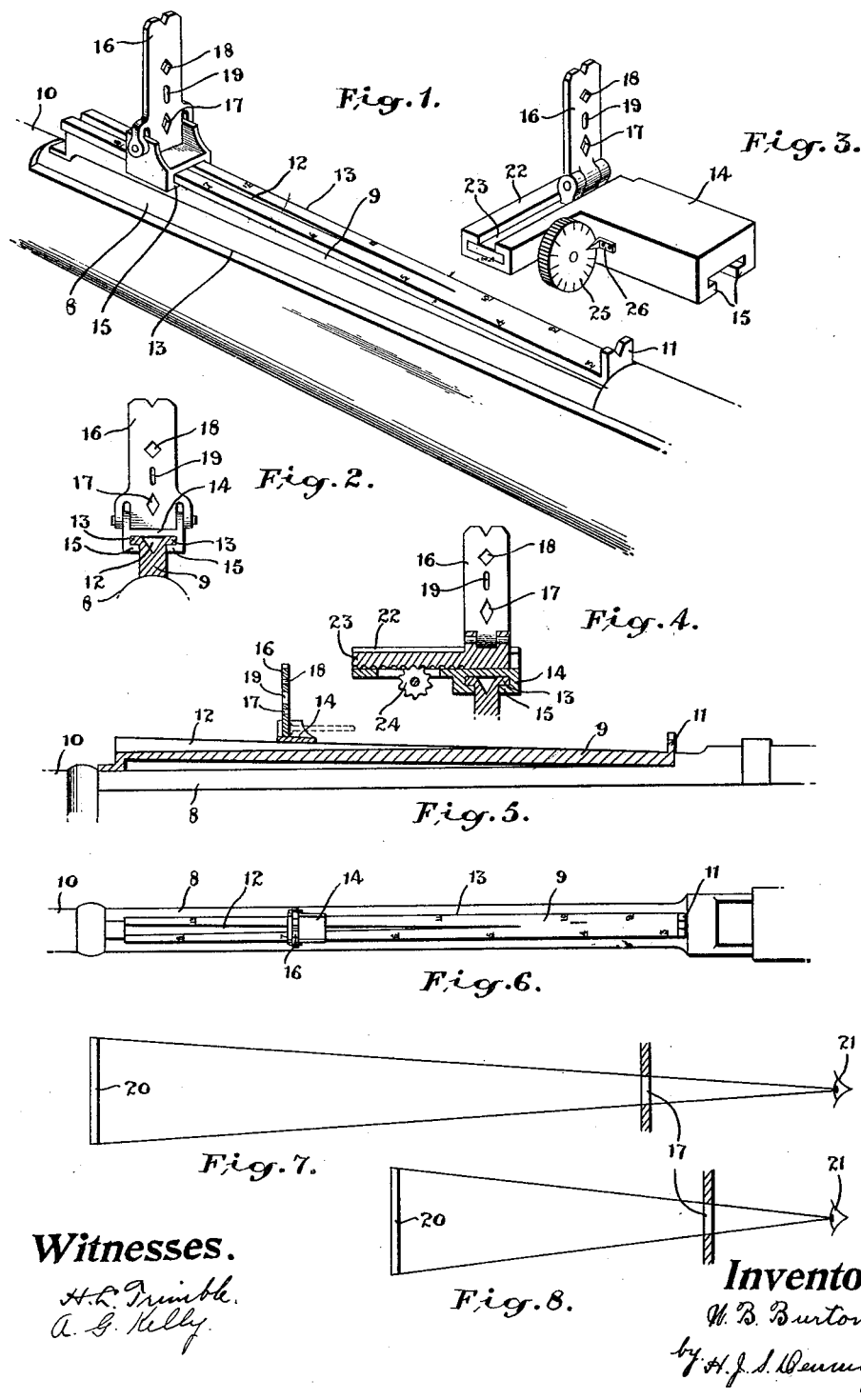

UNITED STATES PATENT OFFICE.

WILLIAM BURTON BURTON, OF ANNANDALE, NEW SOUTH WALES, AUSTRALIA.

RIFLE-SIGHT.

1,142,665. Specification of Letters Patent. Patented June 8, 1915.

Application filed February 21, 1913. Serial No. 749,808.

*To all whom it may concern:*

Be it known that I, WILLIAM BURTON BURTON, a subject of the King of Great Britain and Ireland, residing at Kenton, Kentville avenue, Annandale, in the State of New South Wales, Commonwealth of Australia, have invented certain new and useful Improvements in Rifle-Sights, of which the following is a specification.

This invention relates to the rear-sighting devices of rifles. In these arms the said devices usually consist of a ladder pivotally mounted upon the top of the barrel and arranged to lie flat thereon when not in use and to be erected into a slightly angular or into a vertical position when required, and a cross-bar provided with a sighting notch or peephole slidably mounted upon the said ladder. The latter is graduated to indicate the correct position of the cross-bar for a given range, but owing to its limited length the graduation marks thereon to be clear and distinct must be limited in number and indicate ranges of considerable difference. Further, with this form of sight it is necessary that the particular range at which it is intended to shoot should be made known to the marksman in order that he may correctly place the cross-bar, and the effecting of such adjustment generally necessitates the removal of the rifle from the shoulder. The lack of capability of fine adjustment is a drawback at all times, and the delay in adjustment of the cross-bar might in war be a matter of considerable moment.

In the peephole form of sight the distance of the sighting aperture from the eye of the marksman is fixed, and consequently the field of vision therethrough varies as the range and the particular object aimed at is seen in a field of different area at each range.

At long ranges the area of the field is very great compared to the target, clearness of definition of the latter being thereby prejudicially affected.

Rifle sights as at present in use are relatively short and their function is merely to elevate the peep hole and not to change the relative distance of said peep hole from the eye. This invention has as its primary object to arrange a rational relation between the elevation of the peep hole or sighting aperture and its distance from the eye with the object of obtaining a constant area of field of vision as seen through the peep hole for the object aimed at. In the ordinary peep hole sight the distance of the sighting aperture from the eye of the marksman is practically fixed, consequently the field of vision therethrough varies as the range and the particular object aimed at is seen in a field of different area at each range.

The object of the present invention is to provide a simple rear sighting appliance of simple construction readily adaptable to any ordinary rifle barrel, and adapted to give quick and sure adjustment, in which variation of the elevation of the sighting aperture is effected by longitudinal movement thereof, and which is so constructed and arranged as to offer a field of vision through the sighting aperture of practically the same area at all ranges.

I will now refer to the accompanying drawings illustrating the construction of rifle sights according to this invention.

Figure 1 is a perspective view of part of a rifle with the appliance attached. Fig. 2 is a cross sectional elevation of the ladder and sliding element. Fig. 3 is a perspective view on a larger scale of the sliding element so constructed that the member carrying the sighting aperture is slidable laterally thereon by means of rack and pinion gear, thereby providing a wind-gage. Fig. 4 is a transverse sectional elevation of Fig. 3. Fig. 5 is a longitudinal sectional elevation of the same. Fig. 6 is a plan view of the same, and Figs. 7 and 8 are diagrammatic views which will be hereinafter described.

The barrel 8 of the rifle has affixed to it the ladder 9 which consists of a strip of metal having its upper surface inclined upwardly toward the muzzle end 10. A fixed rear sight 11 is provided for obtaining alinement at ranges known as point blank, *i. e.* under 300 yards, and to enable the foresight (not shown) to be seen through the notch in the said rear-right the ladder has a groove 12 cut in its upper surface, which groove also reduces the quantity of metal and tends to lightness. The ladder 9 has a pair of outwardly turned flanges 13. 13.

The sliding element consists of a carriage 14 having a pair of inwardly turned flanges 15. 15. by means of which it engages the ladder 9. Pivoted to the said carriage is the member 16 capable of being erected to a vertical operative position and also capable of being reclined to a horizontal inoperative position as shown in dotted lines in Fig. 5. In the said member 16 are formed the peep-sight apertures 17 and 18.

In practice I have found that very good results are obtainable by the use of a sighting aperture of such configuration that the planes of its axes (particularly the vertical axis) are readily determinable, and the most suitable configuration is that of a diamond illustrated in the drawings. It is to be understood however that the type of aperture is optional as some marksmen may have a preference for the ordinary circular aperture or for other types, though the use of the diamond shaped aperture or its equivalent is a safeguard against rolling the rifle, the vertical axes of the sighting aperture and of the target being readily brought into alinement.

At the top of the member 16 a notch sight may be provided for use in obtaining correct alinement of the rifle when shooting at a range outside the effective range of the rifle.

The ladder 9 may be of any convenient length, and suitable markings are provided upon its face to indicate the correct position of the sliding element for a given range. As the sliding element or carriage 14 is caused to slide toward the muzzle, which movement is for shooting at greater range, its distance from the eye of the marksman increases while its distance from the fore-sight decreases, and consequently the height of the sighting aperture above the barrel required to bring the said aperture the fore-sight and the object aimed at into line, is not so great as is necessary with a fixed rear sight. Further, the comparatively great length of the ladder renders possible clear and distinct graduation for ranges of small relative variation. For example while an ordinary ladder sight is graduated in ranges of not less than 50 yards variation it is possible with my invention to graduate the ladder and accurately adjust the sliding element for ranges of 5 yards variation or even less.

To provide for shooting at ranges exceeding say 900 yards without unduly increasing the length of the ladder 9, the ranges up to that distance may be marked on one side of the surface of the ladder and those in excess thereof on the other side. The sliding element is in this case pierced with two sighting apertures one positioned above the other, the marksmen using the upper one for the greater ranges.

Theoretically the length of the ladder is limited only by the length of the rifle barrel, but in practice I find that a length of about 9 inches fulfils all normal requirements.

The use of the inclined ladder such as 9 and the slidable element such as 14 thereon renders possible the determination of the required elevation for shooting at an unknown range within certain limits as hereinafter explained. It will be noted that the movement of the sliding element upon the ladder is oblique, that is to say it simultaneously varies its elevation and its distance from the eye of the marksman and from the object aimed at while the actual area of the field seen remains the same at all positions. If therefore a rifleman acquaints himself by practice with the appearance or proportion in the field of vision (as seen through the sighting aperture) of an object of known size he may when desiring to shoot at an unknown range so adjust the carriage that this proportion is obtained, with the reasonable assurance that the carriage is in the correct position on the ladder to give the elevation required for the particular range, and it is then unnecessary to refer to the graduated scale as the shot may now be fired in the ordinary manner. It is necessary however that the size of the target should be known, and that the marksman's eye when he is adjusting the carriage should be in the correct position for shooting. The sighting aperture may however be made of such dimensions that the field of vision therethrough will embrace only the target, the necessity for judgment of the proportionate size of the target to the field being thereby obviated. If desired, however, the range adduced from the aforesaid adjustment may be read from the graduated scale on the ladder. It is considered, however, that the appliance used in this manner would not be effective at a greater range than say 800 yards, as beyond that human eyesight would probably not be sufficiently dependable.

The diagrammatic views, Figs. 7 and 8 illustrate in exaggerated form the effect referred to. It will be noted that the target 20 is the same size and that the eye 21 of the marksman is in the same position in each case. It will also be noted that the range, i. e., the distance between 20 and 21, is very much greater in Fig. 7 than in Fig. 8, and, in order that the vision through the sighting aperture 17 (or 18) in member 16 may in each case embrace only the target, that the said member is much closer to the eye in Fig. 8 than in Fig. 7. If the correct position of the member 16 and consequently of the carriage 14 is thus determined and the target, the fore-sight and the aperture 17 are then brought into alinement, the required elevation of the muzzle for that particular range is obtained.

It may be convenient for the purpose of range-finding to provide in the element 16 a special range-finding aperture, and this aperture would preferably consist of a vertically elongated slot such as 19 which configuration eliminates side field and conduces to clearness of definition.

It is to be understood that the determination of range requires practice and familiarity with the rifle, just as with ordinary sighting devices these attributes to proficiency are necessary.

The appliance is characterized by simplicity and lightness there being practically only two pieces; also by unobtrusiveness and stability, and it does not interfere with drill movements. It can be attached to any rifle at a minimum of cost, can be affixed at original sight-base on rifle and enables perfect focusing to be obtained through the peep-sight, the field of vision being the same at all ranges.

In certain circumstances it is desirable to use a wind-gage when shooting, and when this is required I so construct the carriage and the member carrying the sighting aperture or apertures that the latter is capable of sliding laterally on the former, such movement being effected by rack and pinion gear. This construction is illustrated in Figs. 3 and 4. The sliding carriage 14 has a channeled lateral extension 22 within which slides a toothed rack 23 to one end of which is attached the apertured member 16. A pinion 24 engages the said rack and is rotatable by means of the disk 25 having a graduated dial on its face, and a pointer 26 is provided so that the extent of the lateral displacement of the member 16 may be accurately and automatically registered.

The attachment of the wind-gage to a sighting appliance constructed and operating as herein described has advantages, inasmuch as the lateral displacement of the wind-gage is the same at all ranges when shooting under the same physical conditions.

Obviously the greater the range the greater must be the windage allowed, that is to say the lateral angularity of the rifle barrel must be increased as the range is increased. As however the member carrying the sighting aperture is moved proportionately closer to the foresight as the range increases so the sighting base is proportionately reduced and the horizontal angle between the line of vision and the rifle barrel is automatically proportionately increased without readjustment of the wind-gage.

The determining of the relative proportions of the sighting orifice and scale is a simple mathematical proposition and depends upon the relative proportion of the sighting aperture, the normal target, say a six-foot height, and the length of rifle barrel together with the height of the fore-sight. It will be readily understood that with these particulars defined the rear sight may be moved longitudinally of the bar according to the difference of range and so that the aperture therein will at the different ranges comfortably inclose the normal target.

If an observation is taken at a short range, say two hundred yards and at a long range, say nine hundred yards the height of the ladder 9 at the two points found may be calculated with reference to the length of barrel, height of fore-sight and muzzle velocity. The height of the ladder in any intermediate points is then determined by a straight line joining the two fixed points and the intermediate graduations are marked by observation of the target through the aperture, care being taken to always observe a standard size of target in the setting of the scale.

In respect to the automatic adjustment of the windage, it is obvious that the base line, that is, the distance between the movable back-sight and the fore-sight is shortened as the range increases, consequently the windage base line automatically varies as the sight is moved along the barrel. For example, suppose we set the rear sight with five points windage. It is obvious that if the setting is not changed when the sight is moved forward along the barrel the angle of lateral deflection of the barrel is automatically increased or decreased.

In practice it is found that the automatic adjustment is correct within a small fraction and that the marksman having obtained by trial or judgment the correct windage for any given range has no need to alter same for other ranges under the same conditions.

What I claim and desire to secure by Letters Patent is:—

1. A rifle sight, comprising, a graduated plane arranged longitudinally of the rifle barrel and inclined in relation thereto, and a member slidably mounted on said inclined plane and having a sighting aperture therein, said plane being so inclined and graduated as to effect the proper elevation of the rifle barrel at the distance of the target when the area of vision as seen through the sighting aperture is maintained uniform.

2. A rifle sight, comprising, a graduated plane arranged longitudinally of the rifle barrel and inclined in relation thereto, a member slidably mounted on said inclined plane, a member having a sighting aperture supported on said sliding member and adapted to be adjusted laterally thereon, said plane being so inclined and graduated as to effect the proper elevation of the rifle barrel at the distance of the target when the area of vision as seen through the sighting aperture is maintained uniform and to effect a proportionate change of lateral inclination of the rifle barrel for windage on a change of elevation.

3. In a rifle sight, an inclined guide way of T-shape in cross section having range graduations thereon, a carriage slidably mounted on the top of said guide way and having inturned edge flanges embracing the head thereof, and a leaf member mounted on said carriage and having a sighting aperture therein.

4. Improvements in rifle sights comprising in combination an inclined plane on the rifle having a longitudinal groove or depression therein, an element slidable longitudinally on the said plane carrying a member in which the rear sighting aperture or apertures is or are formed, and a fixed rear sight arranged in alinement with said longitudinal groove.

In testimony whereof I affix my signature in presence of two witnesses.

WILLIAM BURTON BURTON.

Witnesses:
WM. NEWTON,
CHAS. HATTON.

Copies of this patent may be obtained for five cents each, by addressing the "Commissioner of Patents, Washington, D. C."